United States Patent
Wolcott et al.

(10) Patent No.: US 7,926,414 B1
(45) Date of Patent: Apr. 19, 2011

(54) MATERIAL FOR A MANUAL DRIP COFFEE CONE

(76) Inventors: Justine Marie Wolcott, Santa Cruz, CA (US); William Mark Wolcott, Santa Cruz, CA (US)

(*) Notice: Subject to any disclaimer, the term of this patent is extended or adjusted under 35 U.S.C. 154(b) by 209 days.

(21) Appl. No.: 12/371,617

(22) Filed: Feb. 15, 2009

Related U.S. Application Data

(63) Continuation-in-part of application No. 12/014,647, filed on Jan. 15, 2008.

(51) Int. Cl.
*A47J 31/02* (2006.01)

(52) U.S. Cl. ........... 99/279; 29/428; 29/896.62; 99/306; 99/323; 210/469; 210/470; 210/473; 210/474; 210/497.3; 426/594

(58) Field of Classification Search ................... 210/469, 210/470, 473, 474, 497.01, 497.3, 477, 483; 29/896.62, 428; 99/279, 295, 299, 306, 322, 99/323; 426/594, 596
See application file for complete search history.

(56) References Cited

U.S. PATENT DOCUMENTS

| | | |
|---|---|---|
| 975,874 A | 11/1910 | Korn et al. |
| 1,108,288 A | 8/1914 | Watson |
| 1,160,924 A | 11/1915 | Mangisch |
| 1,377,316 A | 5/1921 | Clermont |
| 1,456,010 A | 5/1923 | Richheimer |
| 1,499,281 A | 6/1924 | Altieri |
| 1,546,434 A | 7/1925 | Catalano |
| 1,681,656 A | 8/1928 | Biette |
| 1,687,345 A | 10/1928 | Meyer |
| 1,763,863 A | 6/1930 | Richheimer |
| 2,061,119 A | 11/1936 | Voigt |
| 2,234,397 A | 3/1941 | Bentz |
| 2,358,556 A | 9/1944 | Block |
| 2,601,821 A | 7/1952 | Johnson |

(Continued)

FOREIGN PATENT DOCUMENTS

BE 662750 A 8/1965

(Continued)

OTHER PUBLICATIONS

One Cup Stainless (Vietnamese) Coffee Maker; internet website, http://fantes.com/coffee-manualdrip.html; date: Feb. 14, 2009.

(Continued)

*Primary Examiner* — Joseph W Drodge

(57) ABSTRACT

A method for fabricating a manual drip coffee cone from sheet material is comprised of three general steps: In the first step, a conical body 1 is formed from sheet material in the shape of a truncated cone to hold a coffee filter. The base of the conical body 1 forms a drip ring 2, which directs dripping coffee into a receiving vessel and prevents the cone from slipping off the vessel. In the second step, a drip plate 3, having at least one drip hole 4, is fixed to the inside of the conical body 1, near the drip ring 2, to form a drip plate 3 at a short height above the drip ring 2 to provide maximum headspace for effective drip filtration. In the third step, a flat ring collar frame 5 having minimal support components is attached to the outside of the conical body 1 near the same height as the drip plate 3 in order to support the cone to sit on top of a receiving vessel to allow a user to see through to the receiving vessel beneath the cone so that the user can view the rising level of coffee inside the vessel below.

15 Claims, 10 Drawing Sheets

U.S. PATENT DOCUMENTS

Figure 1A:
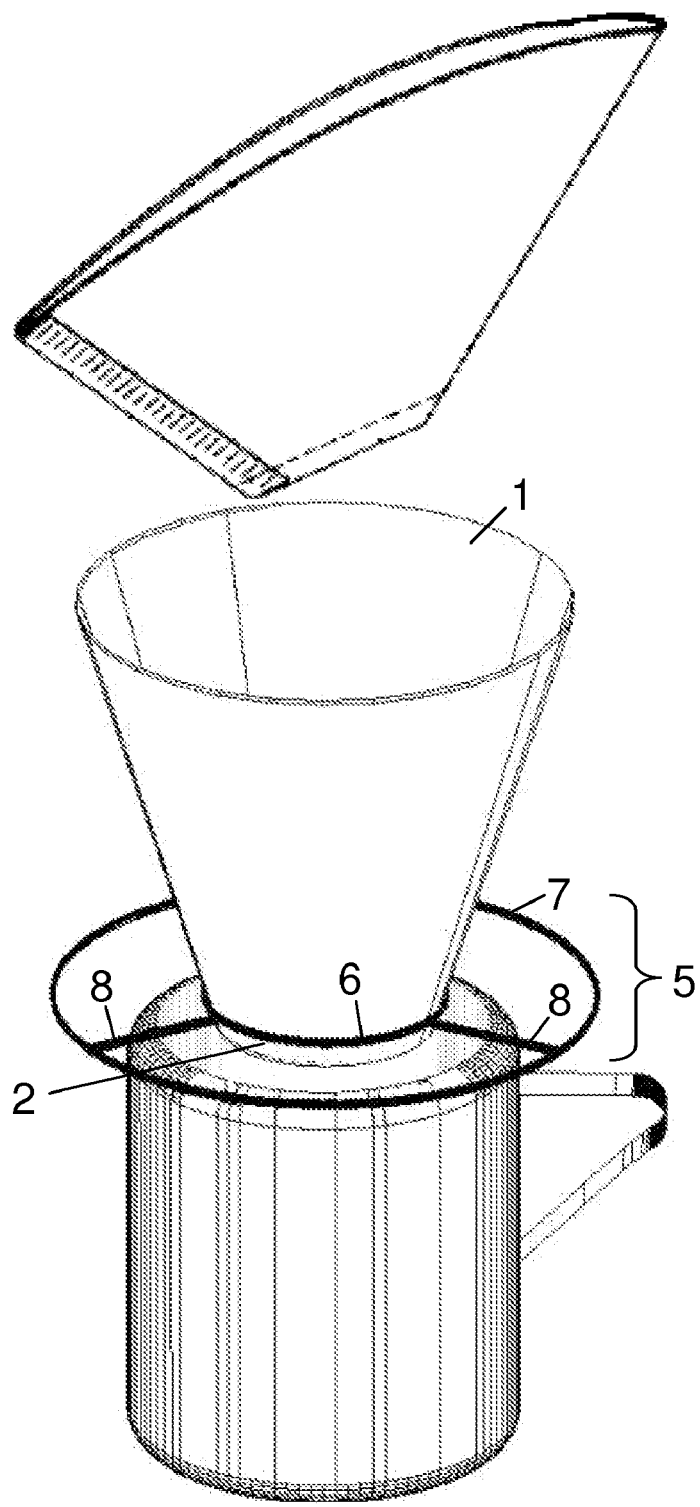

| | | | | |
|---|---|---|---|---|
| 2,660,040 | A | * 11/1953 | Babski | 220/23.83 |
| 2,716,937 | A | 9/1955 | Milano | |
| 2,732,787 | A | 1/1956 | Osborne | |
| 2,835,191 | A | 5/1958 | Clurman | |
| 2,885,290 | A | 5/1959 | Krasker | |
| 3,063,359 | A | 11/1962 | Brant | |
| 3,139,344 | A | 6/1964 | Weisman | |
| 3,215,060 | A | 11/1965 | Perlov | |
| D203,854 | S | 2/1966 | Douglas | |
| 3,334,574 | A | 8/1967 | Douglas | |
| 3,615,708 | A | 10/1971 | Abile-gal | |
| 3,695,168 | A | 10/1972 | Van Brunt | |
| 3,985,069 | A | 10/1976 | Cavalluzzi | |
| 4,061,793 | A | 12/1977 | Daswick | |
| 4,158,379 | A | * 6/1979 | Yarwood et al. | 164/467 |
| 4,167,136 | A | 9/1979 | Chupurdy | |
| 4,221,670 | A | 9/1980 | Ziemek | |
| 4,417,504 | A | 11/1983 | Yamamoto | |
| 4,446,158 | A | 5/1984 | English | |
| 4,520,716 | A | 6/1985 | Hayes | |
| 4,697,502 | A | 10/1987 | English et al. | |
| 4,867,880 | A | 9/1989 | Pelle | |
| 4,986,172 | A | * 1/1991 | Hunnicutt, Jr. | 99/306 |
| 5,064,980 | A | * 11/1991 | Grossman et al. | 219/689 |
| 5,424,083 | A | * 6/1995 | Lozito | 426/82 |
| 5,590,581 | A | * 1/1997 | Strub et al. | 99/302 R |
| 5,826,493 | A | * 10/1998 | Tien Lin | 99/306 |
| D406,725 | S | 3/1999 | Joergensen | |
| 5,894,786 | A | 4/1999 | Miya | |
| 2002/0005367 | A1* | 1/2002 | Zelson | 206/449 |
| 2002/0043181 | A1* | 4/2002 | Gist | 108/26 |
| 2006/0169150 | A1* | 8/2006 | Voss et al. | 99/295 |

FOREIGN PATENT DOCUMENTS

| | | |
|---|---|---|
| CH | 458663 A5 | 6/1968 |
| DE | 617100 | 8/1935 |
| DE | 635095 | 9/1936 |
| DE | 652010 | 10/1937 |
| DE | 818683 | 10/1951 |
| DE | 1057760 | 5/1959 |
| DE | 2607605 | 9/1977 |
| DE | 2808215 | 8/1979 |
| FI | 42462 B | 4/1970 |
| FR | 1105494 | 12/1955 |
| GB | 400077 | 10/1933 |
| GB | 415929 | 9/1934 |
| GB | 494312 | 10/1938 |
| GB | 1103912 A | 2/1968 |
| JP | 52088462 | 7/1977 |
| JP | 54108775 | 8/1979 |
| JP | 54127072 | 10/1979 |
| JP | 54136981 | 10/1979 |
| JP | 6054760 | 3/1994 |
| JP | 10286180 | 10/1998 |
| JP | 10314033 | 12/1998 |
| LU | 48391 A | 6/1965 |
| NL | 46196 C | 7/1939 |
| NL | 6504902 | 10/1965 |
| NO | 117998 B | 10/1969 |

OTHER PUBLICATIONS

Snow Peak Collapsible Coffee Dripper; internet website, http://snowpeak.com/back/coffee/index.html; date: Feb. 14, 2009.

Bodum Kona Coffee Maker; internet website, http:// fantes.com/coffee-manualdrip.html; date: Feb. 14, 2009.

Melitta Porcelain Filter Drip Coffee Maker; internet website, http://fantes.com/coffee-manualdrip.html; date: Feb. 14, 2009.

2 Cone Coffee Filter Holder; internet website, http:// fantes.com/coffee-manualdrip.html; date: Feb. 14, 2009.

Swiss Gold Coffee Maker; internet website, http:// fantes.com/coffee-manualdrip.html; date: Feb. 14, 2009.

Alfi Aroma Coffee Filter; internet website, http:// www.metrokitchen.com/product/AL-32124024620; date: Feb. 14, 2009.

6 Coffee Filter Holder for Thermal Containers; internet website, http:// fantes.com/coffee-manualdrip.html; date: Feb. 14, 2009.

Bonjour Smart Brewer; internet website, http:// fantes.com/coffee-manualdrip.html; date: Feb. 14, 2009.

Melitta Ready Set Joe Coffee Filter; internet website, http:// fantes.com/coffee-manualdrip.html; date: Feb. 14, 2009.

One Cup Coffee Maker; internet website, http:// rei.com/product/401153/; date: Jan. 13, 2008; (product no longer available).

* cited by examiner

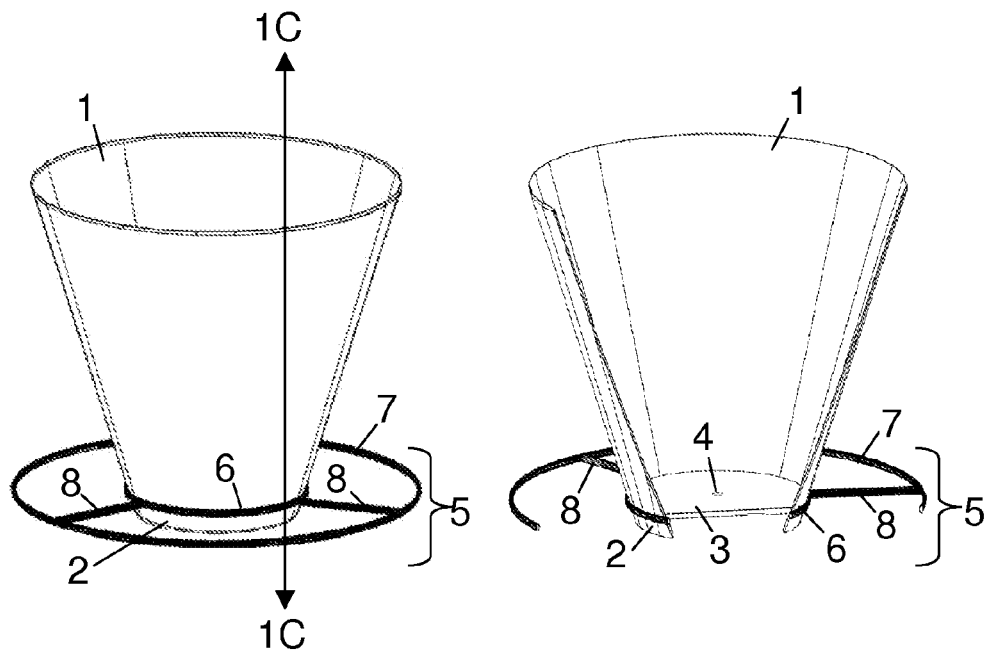
FIG. 1B  FIG. 1C
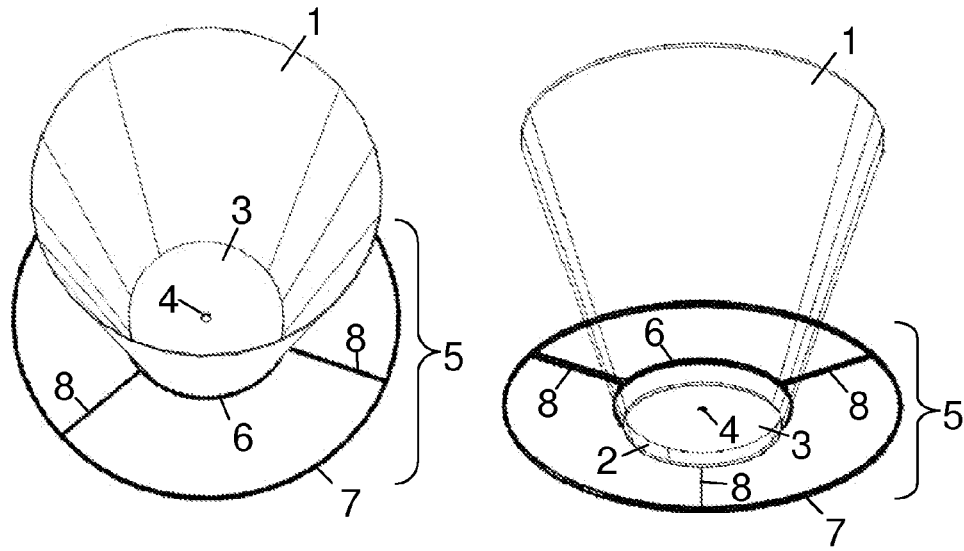
FIG. 1D  FIG. 1E

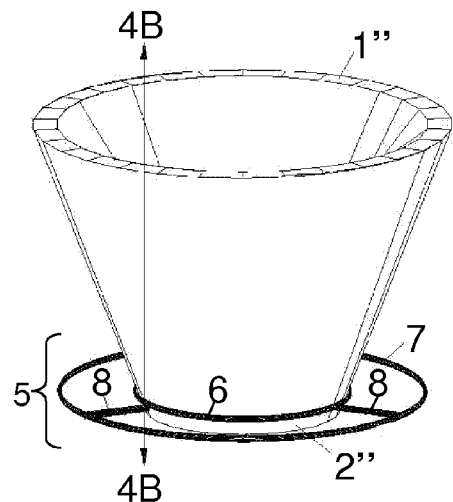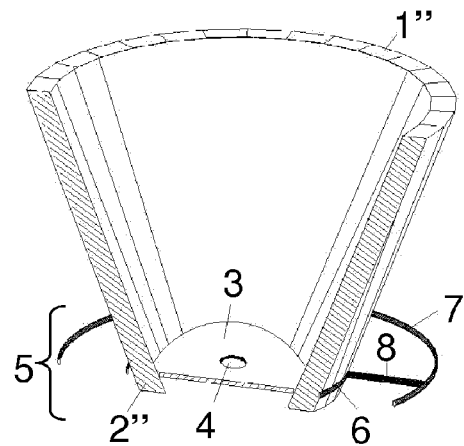
FIG. 4A  FIG. 4B
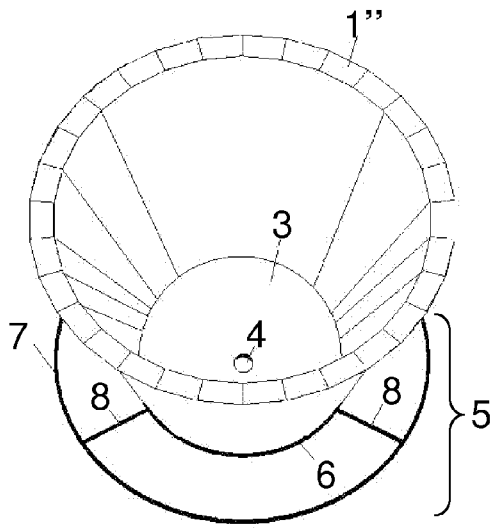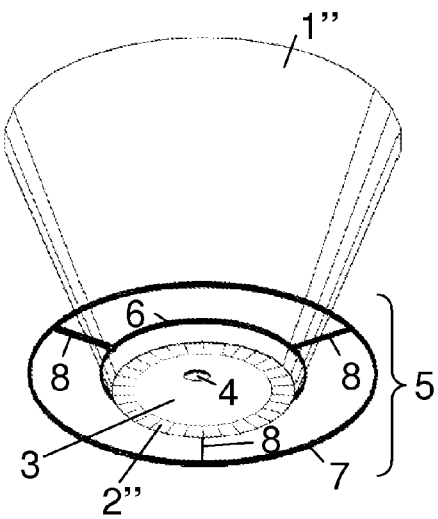
FIG. 4C  FIG. 4D

Prior Art
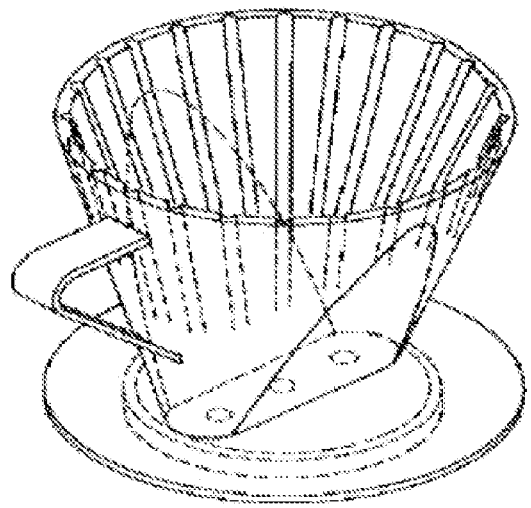
FIG. 6A
Foreign patent JP12286180 (Tanaka; 1998).
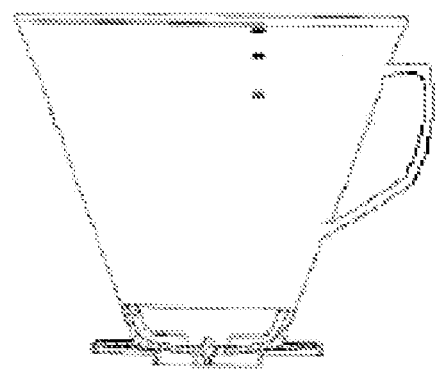 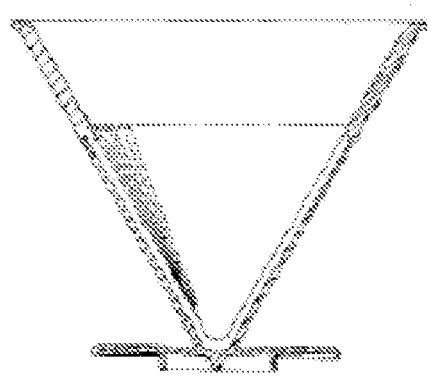
FIG. 6B     FIG. 6C
Foreign patent LU48391 (Bentz; 1965).

Prior Art

U.S. patent D203,854 (Douglas; 1966).

U.S. patent 2,835,191 (Clurman; 1958).

Prior Art

U.S. patent 224,397 (Bentz; 1941).

U.S. patent 4,221,670
(Ziemek & Kabel; 1980).

U.S. patent 975,874
(Korn & Kuhn; 1910).

MATERIAL FOR A MANUAL DRIP COFFEE CONE

CROSS-REFERENCE TO RELATED APPLICATION

Ser. No. 12/014,647; this is an application for a Continuation In Part. Please apply the original filing date of Jan. 15, 2008 to all material herein that is already contained in application Ser. No. 12/014,647.

FEDERALLY SPONSORED RESEARCH

Not applicable.

SEQUENCE LISTING OR PROGRAM

Not applicable.

BACKGROUND

1. Field of Invention

This invention relates generally to an improved method for fabricating a manual drip coffee cone. An improved design is needed for manual drip coffee cones that can be easily fabricated from material in flat sheet form, such as sheet metal.

2. Prior Art

A manual drip coffee cone is a common type of coffee maker used worldwide. These cones are designed to sit on top of a coffee cup or carafe. Water is poured through a cone holding a filter with coffee grounds, so that coffee drips into the cup or carafe below. This simple coffee-making tool is compact, quick and easy to use and clean, and inexpensive to buy. Following is a discussion of problems with prior art.

Problems with Designs for Molded Materials

Most modern designs for coffee cones are tailored to fabrication with glass, ceramic, or plastic material in a molding process. A cone design for a molded process is not compatible with sheet metals such as stainless steel, aluminum, and others. Molded designs have multiple protruding elements on the conical body and ring collar that are easily turned out in a mold, but that are cost prohibitive to achieve with sheet materials. Sheet metal is commonly drawn or spun. However, most modern coffee cone designs are limited to molten molded fabrication. Molten fabrication with metal is cost-prohibitive. The problem to solve is to create a superior and cost-effective cone design for fabrication with sheet materials so that sheet metal, such as stainless steel, and other sheet materials can be used.

There is a currently un-answered need for metal coffee cones. A modern-style metal coffee cone would offer a new choice to consumers who are looking for lightweight alternatives to plastic. Metal has the light weight and durability of plastic, and the inert surface chemistry of glass and ceramic that resists odors, scratching, and flammability. Unlike plastic, metal cones will not melt when placed near an open flame, or hot stove burner. Metal has better taste than plastic kitchen utensils because metal does not retain food odors. Even after cleaning them, coffee drippers made of plastic often retain a rancid coffee taste. Another problem is that as a petroleum product, plastic coffee cones can be perceived to pose a health risk. Plastic ingredients, such as phthalates and bisphenols, can be perceived to have the potential to leach into hot liquids prepared in plastic kitchenware. Manufacturing byproducts of plastic, such as propylene from molded polypropylene thermoplastic resin, can also be perceived to be toxic. Concerns such as these are enough to stimulate a consumer demand for a coffee cone that is made of metal material, such as stainless steel. Metal is superior to plastic for reasons of health, environmental concerns, aesthetic choice, durability, and taste. Many consumers are switching from plastic kitchenware and plastic water bottles to stainless steel. Glass and ceramic are not superior alternative materials for coffee cones because they easily break when dropped. Therefore, a coffee cone design is needed that can be most economically made from metal, and particularly, made easily from the form of flat sheet metal.

Ineffective View Beneath the Cone

A superior design should have a ring collar that provides an easy view beneath the cone in order to see the rising level of the coffee in the cup below. It is a great advantage to see through to the coffee below so that the user does not have to lift the cone off the cup during the dripping process in order to see when coffee dripping is done. Without a view, the user often pours too much water into the cone. The receiving cup spills over because the user cannot see when to stop. Some plastic cones disclosed by prior art provide a limited view beneath the cone, but none allow a full view. To simplify fabrication for sheet materials, and also to provide a full view through the ring collar, the ring collar needs to have the simplest shape and least possible surface area.

Solving Problems of Prior Art

Two aspects of prior art need to change to make an efficient coffee cone design for sheet material, such as sheet metal:

1) Problematic Drip Ring Width: The drip ring must be the base of the conical body, rather than attached as a separate component to the base of the conical body or ring collar. This simplifies construction by reducing the number of components attached to the cone. In molded designs, additional components are part of a mold that turns out protruding features in one step. In contrast, using sheet materials, all protruding elements must be fastened to a main body as separate components that each have additional fabrication steps. Therefore, it is necessary to simplify the number of protrusions when designing for sheet materials in order to eliminate additional attachment steps. In a design for sheet materials, it is most efficient for the base of the conical body to be one in the same as the drip ring.

In contrast, prior art discloses drip rings that are most compatible with molded fabrication. Drip rings disclosed by prior art are not the same width as the base of the cone, and so would have to be attached in an additional step if using sheet material. Examples of prior art that disclose a drip ring with a different width than the base of the conical body are foreign patent JP10286180 to Tanaka (1998) FIG. 6A, and foreign patent LU48391 to Bentz (1965) FIGS. 6B and 6C. Tanaka discloses a drip ring that is wider than the base of the cone FIG. 6A. Bentz discloses one drip ring that is narrower than the base of the cone FIG. 6B, and one that is wider FIG. 6C.

2) Superior See-Through Ring Collar: The shape of the ring collar must be simple in order to facilitate construction. Simultaneously, the ring collar should provide the best possible view through it to see beneath the cone. To achieve this, the mass and surface area of the ring collar should be reduced to the fullest extent. This also saves overall weight and material costs.

The ring collar should be fabricated in the configuration of a flat plane, as a frame. It is presently envisioned that one preferred design has a ring collar with three radial spines connected to the outside of the cone that support the cone to sit on its cup. This is similar to a wheel with three spokes. A ring collar with the simplest shape, minimal number of components, and least possible surface area will allow the fullest view to the cup below, and have the least overall weight, and least material costs. Such a frame can be made from metal tubular wire, or similar construction. With the ring collar constructed as a wheel-and-spoke-style frame, the user does not have to adjust or move the cone to different angles to see into the cup below because no angle of vision is obstructed. Such a minimal frame cannot be achieved with plastic material. A wheel-and-spoke style frame made of plastic would not have enough structural integrity to withstand equal force and so would easily snap and break. Thin rods or spokes are far stronger in metal material than plastic. Prior art has not disclosed a spoke-style ring collar that is flat. The same frame in plastic would require much greater surface area to withstand the same force. It is that greater surface area and mass of molded ring collars disclosed to date that obstructs the user's view to beneath the cone.

The simplest ring collar that a user can see through has two important elements. First, to facilitate fabrication, the ring collar should be constructed in a flat plane, and have a minimal number of support arms. Second, the ring collar should have the least possible surface area, in order to allow the best view through it. Wire tubing, or similar construction, such as with rods, is well suited to make such a frame.

Prior art that discloses inefficient views through the ring collar includes U.S. Pat. No. D203,854 to Douglas (1966) FIGS. 7A and 7B, U.S. Pat. No. 3,334,574 to Douglas (1967) (similar to FIG. 7A), and U.S. Pat. No. 2,835,191 to Clurman (1958) FIGS. 7C and 7D. The ring collars disclosed by prior art have overly complicated design features. Neither Douglas nor Clurman reduced the ring collar's surface area to the fullest extent possible. Further, Douglas discloses a ring collar that has a flared ramp shape, instead of a flat plane, which makes its fabrication more complicated and expensive if it were to be applied to use with sheet material. Similarly, the ring collar disclosed by Clurman is more complicated to fabricate than a flat planar shape because it has support legs that extend into the vertical plane. Additionally, the view through these ring collars is partially obstructed because a large surface of the ring collar remains and blocks the view to the coffee below at certain angles. This forces the user to adjust one's head or the cone itself in order to try to see clearly beneath the cone to inside the cup below.

One example of prior art made by the Japanese company 'SnowPeak' (Information Disclosure Statement By Applicant, USPTO form SB08b; Citation #2) discloses a collapsible folding ring collar on a metal cone. However, this ring collar is not a flat planar shape. Instead, it has a complicated interlocking set of four legs that extend out from the conical body in both the horizontal and vertical directions. Further, each leg has hinges that allow them to fold flat. All facets of the hinged legs that allow it fold make the overall supporting ring collar overly complicated and expensive to fabricate because multiple steps are required to attach each component. Also, the cone disclosed by Snow Peak has legs that do not have lateral support, making the cone unstable and easily tipped over.

These two changes to prior art simplify and improve it to create a most efficient and effective coffee cone design for fabrication with sheet materials such as sheet metals. These two changes simplify fabrication for the drip ring and a see-through ring collar. A superior cone design for sheet material must minimize the number of components because adding each one is costly. Simplifying the number of components also maximizes the cone's overall strength.

Two additional elements are necessary for a superior cone design—the height of the drip plate, and omission of interior ribbing.

1) Drip Plate Height: The level of the drip plate should not be set below the ring collar. Instead, the drip plate should be set at or near the same level as the ring collar in order to provide the maximum height of head space for dripping into the cup below. When a drip plate height is set too low inside its receiving vessel, then coffee filtration becomes submerged in the rising level of the coffee. This makes the water level back up inside the cone above, and hinders the filtration process. It is much more effective for drip filtration to occur above the rim of the cup. This is achieved by setting the drip plate at the same height as the ring collar. Examples of prior art that disclose a drip plate set too deep into its receiving vessel include U.S. Pat. No. 224,397 to Bentz (1941) FIGS. 8A and 8B, U.S. Pat. No. 4,221,670 to Ziemek and Kabel (1980) FIG. 8C, and U.S. Pat. No. 975,874 to Korn and Kuhn (1910) FIG. 8D.

2) Omission of Ribbing: There should not be vertical ribs inside the conical body. Ribbing complicates fabrication and adds expense, and is unnecessary for effective coffee percolation. Examples of prior art that disclose vertical ribbing inside the cone include Tanaka FIG. 6A, and Bentz (1941) FIGS. 8A and 8B. Much of the prior art describes ribbing on the interior wall of the cone as facilitating flow of coffee downward. However, coffee filters equally well when the cone has a smooth surface inside the cone. Funnels used in chemistry labs function similarly. In a chemical laboratory application, a conical funnel with a smooth interior is used with paper filters for extracting liquid solutions through particulate matter such as a saturated paste or soil. Just like these funnels, coffee cones also filter very well without vertical ribbing. One example of prior art made by the Bodum company (Information Disclosure Statement By Applicant, USPTO form SB08b; Citation #5) discloses a glass coffee funnel with a smooth interior. To include vertical ribbing in a metal cone not made from a mold, the ribs would have to be added onto the inside of the cone in an additional fabrication step. For instance, individual spines might be welded onto the inside of the cone, or grooves could be cut into the surface of an extra-deep sheet of metal. Ziemek and Kabel FIG. 8C attempt vertical ribbing by disclosing a corrugated conical body. However, this corrugation complicates and adds expense to the fabrication process. A corrugated surface also complicates attachment of the ring collar and drip plate to the conical body. Ribbing or corrugation must be omitted from an optimum cone design because it is unnecessary for filtration, and complicates fabrication. Instead, a smooth cone interior saves material and manufacturing expenses, and also is easier for the user to wash after each use.

Other design elements are changed in additional embodiments of the invention. Changed elements of additional embodiments include: A conical body with an oval-shaped base and drip ring; a drip plate hole with a sieve screen; an insulated conical body; and a solid ring collar.

Oval-Shaped Base and Drip Ring: An ovular shape for the base of the cone is more similar to standard paper filters that have a straight-shaped bottom (popularized by Melitta), and so may have wider consumer appeal than the circular shape of the base of the cone in the first embodiment. However, both the circular and the ovular shape for the base of the cone function equally well with the same paper filters. The drip ring that is the base of the cone is correspondingly oval-shaped, as is the drip plate and the ring collar where they attach to the ovular conical body.

Drip hole with sieve screen: It is also envisioned that the same design for a coffee cone can be made with a drip ring that has a large drip hole with a screen or sieve that acts as a filter. This embodiment does not require the use of a separate removable filter. It can be used with one optionally if the user desires to filter oils from the coffee, or to use a removable filter for easy disposal of the grounds.

Improved Insulation: A cone can be made more insulating by fabricating the conical body with double wall construction. A superior cone design would provide insulation for the coffee and for the user's protection. An additional embodiment of the invention is constructed with metal material as a double walled cone that has air or vacuum insulation. Insulation keeps hot water warmer as it drips through the cone and reduces cooling of the coffee. Insulation also affords the user protection from an overly hot cone surface while the person handles the cone during use. Vacuum-insulated double-walled construction has become popular in the manufacture of similar items, such as travel mugs and thermoses. A double-walled embodiment of the invention offers better insulating capacity than single-walled embodiments. However, a double-walled version costs more to produce. Therefore, it is important to create both single and double-walled versions, so that consumers have a price choice. Single-walled metal coffee cones operate as well as single-walled coffee cups that are commonly sold. That is, they work well enough, but if you can afford it, it is nicer to have double-walled. However, single-walled metal cups remain popular consumer items because they cost less. Therefore, it is expected that there is a demand for both single and double-walled versions of the cone.

Foreign patent DE2607605 to Schnause (1977) discloses an insulated conical body. However, insulation disclosed by Schnause is too narrowly limited to allow more modern innovations that use air or vacuum insulation between double walls. Schnause discloses a cone with insulation restricted to foam. In his Claims, Schnause limits insulation to foam as follows:

"4) Filter housing after 1) to 3), thereby characterized, that that warm damming material from a foam material molded article exists.

5) Filter housing after 1) to 4), by the fact characterized that Foam material molded article from PURE, PP, PE, PVC, PMM exists.

6) Filter housing after 1) to 5), by the fact characterized that the foam material molded article consists of a flexible material.

7) Filter housing after 1), by the fact characterized that it consists of an integral foam material.

8) Filter housing after 1) to 7), by the fact characterized that it consists of polyurethane integral foam."

Schnause's claims are tailored to plastic molded cones. Schnause's claims do not provide for insulation compatible with metal construction as is provided by vacuum, or simply by air space. Another problem with the Schnause design is that the drip ring is not the same as the base of the conical body, and is a separate protrusion attached to the bottom of the ring collar. This limits its fabrication to molded methods, or else requires that the drip ring be attached to the conical body as a separate component in an extra fabrication step.

Solid Ring Collar: It is also envisioned that the same design for a coffee cone can be made as a less expensive version that does not provide a view beneath the cone. This embodiment has a simplified ring collar that is a solid plane. This embodiment has lower production costs. This provides consumers a choice of cone that offers all the benefits of metal's strength and inert surface chemistry, but that does not have the added expense of the frame-style ring collar.

SUMMARY OF THE INVENTION

It is the general object of the current invention to provide a method to most easily fabricate a drip coffee cone using flat sheet materials, and to make a simplified ring collar for the cone that provides the best possible view to the vessel underneath. Two design features of prior art that must change in order to fabricate a superior coffee cone from sheet materials are: 1) the drip ring must be the same as the base of the conical body, so that the drip ring does not need to be attached as a separate component; 2) the ring collar shape must be flat, whereby its fabrication is simplified, and must be and composed of minimal support elements, such as a wheel frame with minimal surface area and a minimal number of spokes to maximize the view beneath the cone.

Fabrication is accomplished as three general steps. First, a conical body is formed from sheet material in the shape of a truncated cone. The base of the cone serves as a drip ring. Second, a plate with at least one drip hole is fixed inside the conical body near the base of the cone, set at a short height above the bottom of the cone, to form a drip plate, whereby maximum head space for dripping is provided. Third, a ring collar constructed as a flat frame with minimal support arms is attached to the outside of the conical body near the same height as the drip plate in order to support the cone to sit on top of a cup, carafe, or other receiving vessel. The frame is constructed of a minimal number of support arms that have minimum surface area in order to allow the user to see through the ring collar and easily view the rising level of coffee in the vessel beneath the cone.

DRAWINGS—FIGURES

First & Additional Embodiments

Embodiment 1: Circular Base

Figure 1F:
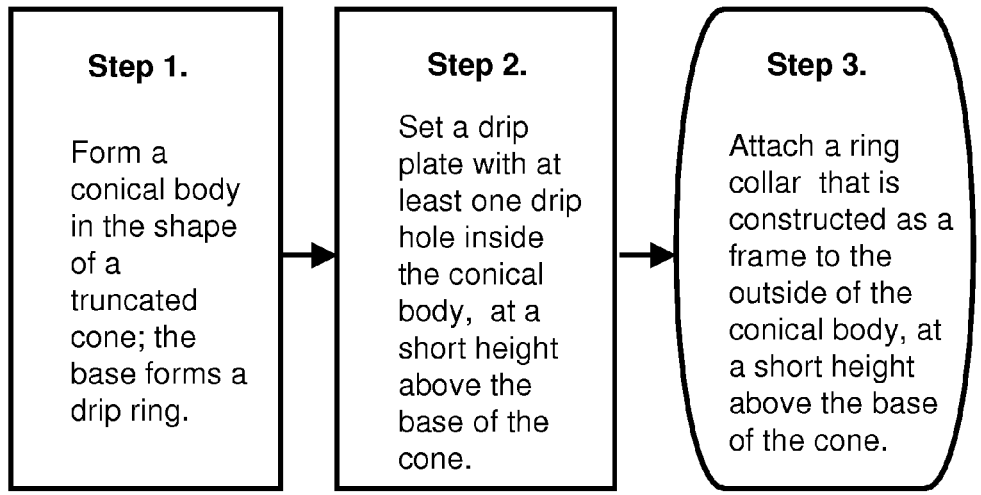
Figure 1G:
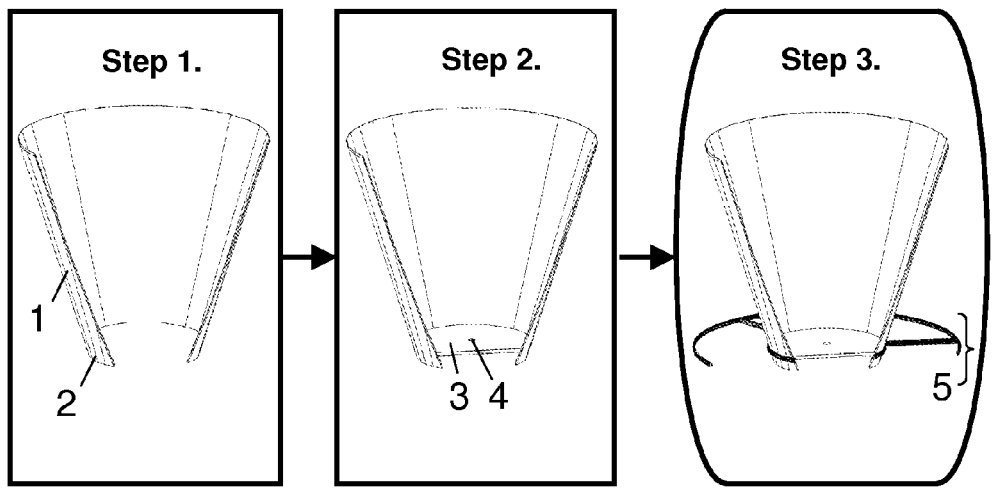

FIG. 1A shows a coffee cone in accordance with one embodiment placed upon a typical cup, and shown with a typical paper filter. This conical body has a circular-shaped base. FIGS. 1B to 1E show front, cross sectional, top, and bottom perspective views in accordance with Embodiment 1. FIGS. 1F and 1G show flow charts of the fabrication process for Embodiment 1. FIG. 1F is a flowchart as a text description. FIG. 1G is a flowchart as figures in cross-section view.

Embodiment 2: Ovular Base

Figure 2A:
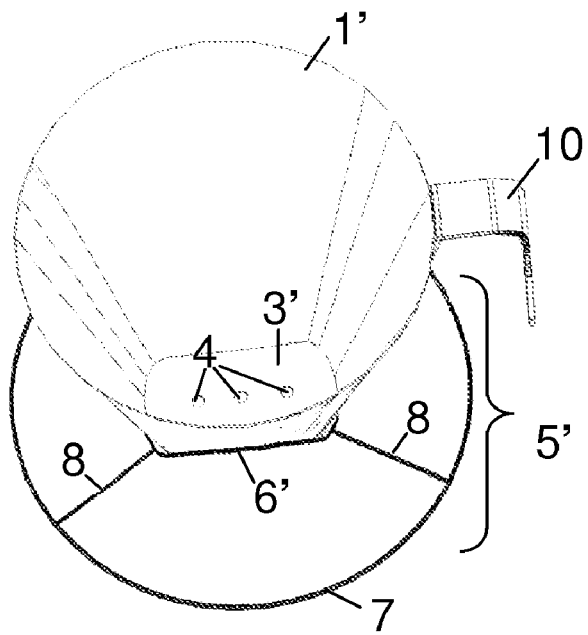
Figure 2B:
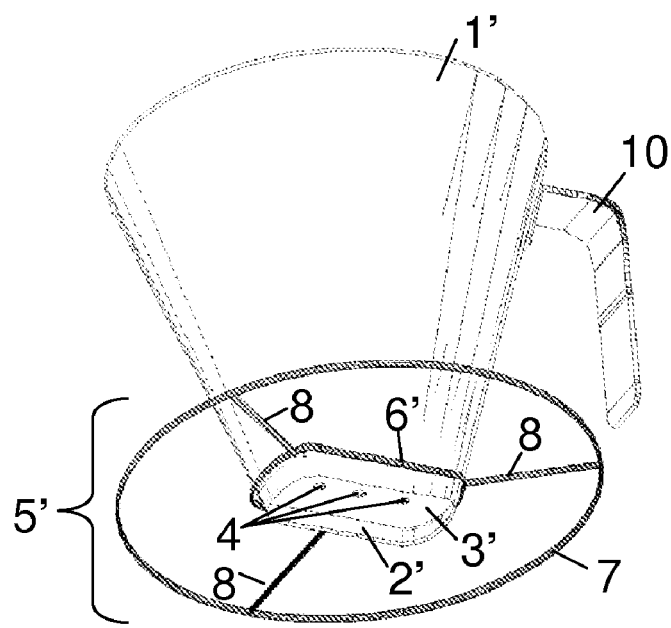

FIGS. 2A and 2B show top and bottom perspective views in accordance with another embodiment that has an ovular or rounded-rectangular shaped base. The corresponding drip plate and ring collar are also ovular-shaped where they attach to the ovular conical base.

Embodiment 3: Drip Hole with a Screen

Figure 3A:
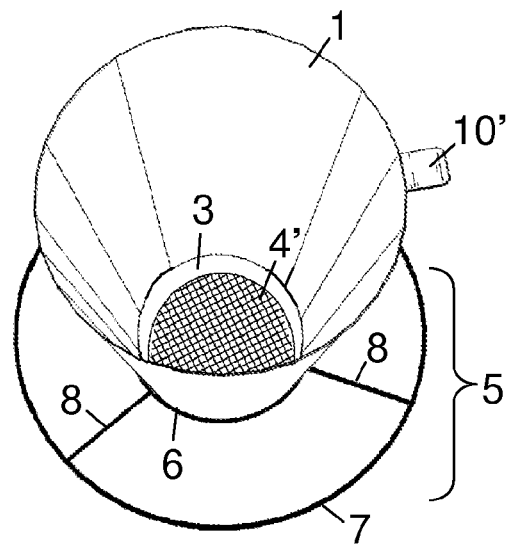
Figure 3B:
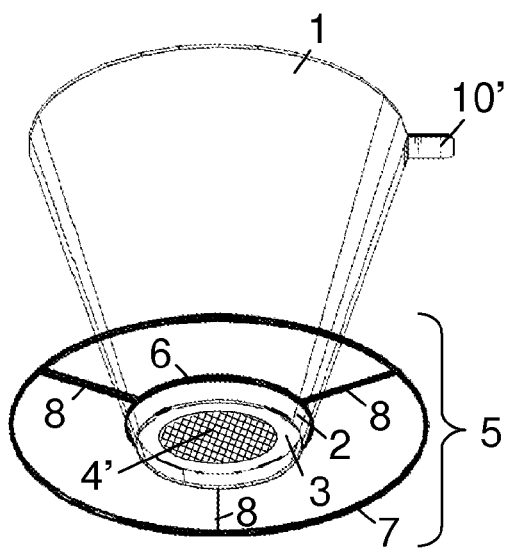

FIGS. 3A and 3B show top and bottom perspective views in accordance with another embodiment that has a screen in the drip plate, whereby use of filters is optional.

Embodiment 4: Double-Walled

FIGS. 4A to 4D show front, cross sectional, top, and bottom perspective views in accordance with another embodiment that has a conical body with double wall construction, whereby the conical body has greater insulation.

Embodiment 5: Solid Ring Collar

Figure 5A:
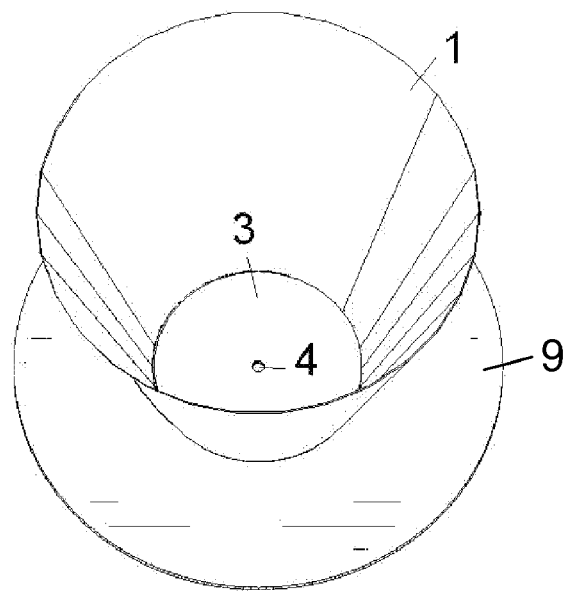
Figure 5B:
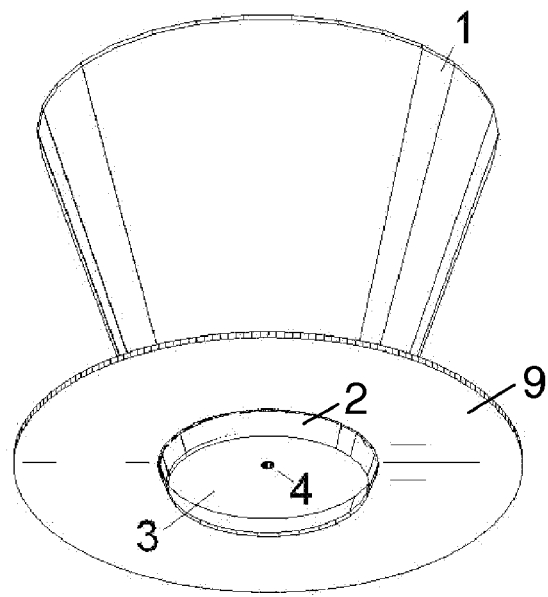

FIGS. 5A and 5B show top and bottom perspective views in accordance with another embodiment that has a solid ring collar, whereby a simpler, less expensive version of the cone can be produced.

PRIOR ART

Prior Art: Problematic Drip Ring

FIGS. 6A to 6C show prior art that has an overly complicated drip ring. These figures disclose a drip ring that has a different width than the base of the cone, whereby the drip ring must be attached as a separate component, or else be part of molded design. FIG. 6A shows foreign patent JP10286180 to Tanaka (1998). FIGS. 6B and 6C show foreign patent LU48391 to Bentz (1965).

Prior Art: Problematic Ring Collar

Figure 7A:
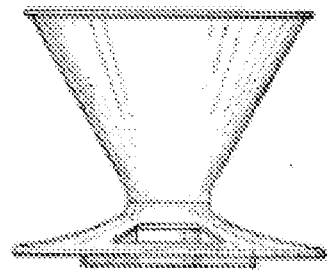
Figure 7B:
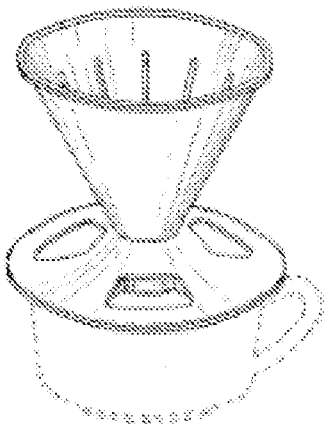
Figure 7C:
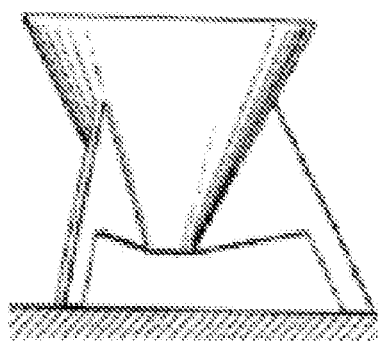
Figure 7D:
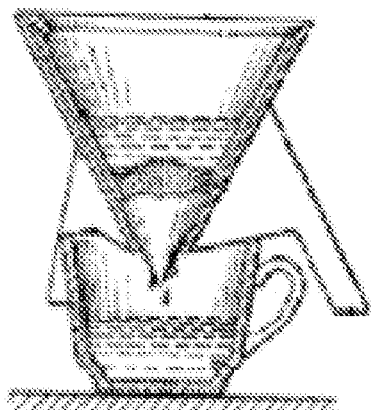

FIGS. 7A to 7D show prior art that has an overly complicated and ineffective ring collar. These figures disclose ring collars that are not shaped as a flat plane. Also, these figures disclose window openings in the ring collar that do not minimize the ring collar's mass and surface area to the fullest extent possible. This causes the view beneath the cone to be obstructed from various angles. FIGS. 7A and 7B show U.S. Pat. No. D203,854 to Douglas (1966). FIGS. 7C and 7D show U.S. Pat. No. 2,853,191 to Clurman (1958).

Prior Art: Problematic Drip Plate Height

Figure 8A:
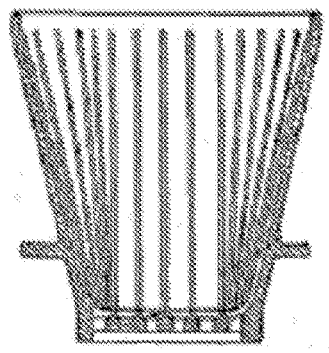
Figure 8B:
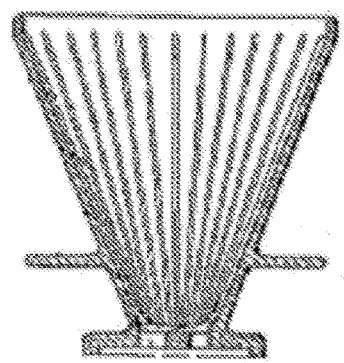
Figure 8C:
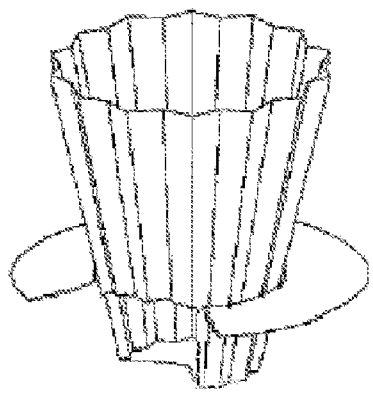
Figure 8D:
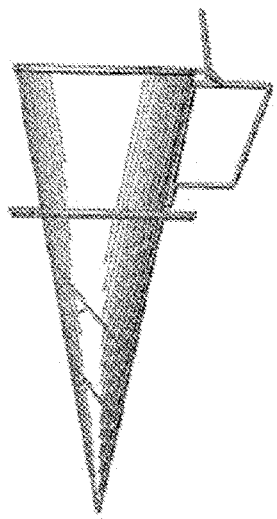

FIGS. 8A to 8D show prior art that has an ineffective drip plate height. These figures disclose a drip plate or drip terminus that extends too low below the ring collar into the receiving cup, whereby headspace for dripping is not maximized, and dripping is hindered. FIGS. 8A and 8B show U.S. Pat. No. 224,397 to Bentz (1941). FIG. 8C shows U.S. Pat. No. 4,221,670 to Ziemek and Kabel (1980). FIG. 8D shows U.S. Pat. No. 975,874 to Korn and Kuhn (1910).

DRAWINGS—REFERENCE NUMERALS

FIGS. 1A to 5B
1 Conical body with a circular base
1' Conical body with an ovular base
1" Conical body with a circular base and double wall construction
2 Drip ring with a circular shape
2' Drip ring with an ovular shape
2" Drip ring with a circular shape and double wall construction
3 Drip plate with a circular shape
3' Drip plate with an ovular shape
4 Drip hole
4' Drip hole with a screen
5 Ring collar frame-whole unit comprising parts 6, 7, 8
5' Ring collar frame-whole unit comprising parts 6', 7, 8
6 Ring collar frame-inner ring-circular shape
6' Ring collar frame-inner ring-ovular shape
7 Ring collar frame-outer ring
8 Ring collar frame-radial spine
9 Ring collar-solid sheet
10 Handle-measuring cup style
10' Handle-tab style

DETAILED DESCRIPTION

FIGS. 1A to 1G—Embodiment 1: Circular Base

One embodiment of the cone is illustrated in FIG. 1A (front perspective view of the coffee cone placed upon a typical cup), FIG. 1B (front view), FIG. 1C (cross-section view), FIG. 1D (top view), and FIG. 1E (bottom view). The coffee cone has a conical body with a circular base 1 that is truncated at the bottom. The base of the conical body 1 forms a drip ring with a circular shape 2. The first function of the drip ring 2 is to direct drips downwards. The second function of the drip ring 2 is to prevent the cone from slipping off the cup on which it sits. Inside the conical body 1 is a drip plate with a circular shape 3. As shown in cross-section FIG. 1C, the drip plate 3 is set inside the conical body 1 a short height above the drip ring 2. The drip plate 3 has one drip hole 4. Attached to the outside of the conical body 1, at the same height as the drip plate 3, is a ring collar frame 5 that radiates out laterally from the coffee cone in manner similar to a wheel with three spokes. The ring collar frame 5 is comprised of an inner ring with a circular shape 6, an outer ring 7, and three radial spines 8. The ring collar frame 5, allows the coffee cone to sit on a cup or carafe. A user can see through the ring collar because it is a frame. This enables the user to easily view the rising level of coffee in the cup beneath the cone. Attaching both the drip plate 3, and the ring collar frame 5 at a short height above the drip ring 2 provides maximum head space for dripping to occur beneath the cone.

An important feature of the present invention is the use of the bottom of the conical body 1 as the drip ring 2. This design allows the conical body 1 to serve two functions. The top part of the conical body 1 holds coffee grounds for filtration, while the bottom part of the conical body 1 is the drip ring 2. This eliminates the need for a drip ring to be attached separately in an additional fabrication step. This innovation allows the cone to be easily fabricated with sheet material instead of molded material because the same sheet of material forms two components simultaneously.

Another important feature of the design is that both the drip plate 3 and the ring collar frame 5 are set a short height above the drip ring 2. This allows drip filtration to occur at the same height as the rim of the cup beneath. This allows maximum head space above the cup's rim for coffee to drip into the cup below.

An additional important aspect of the design is that the surface area and mass of the ring collar frame 5 is minimized to the fullest extent possible. The ring collar frame 5 is a flat planar shape, and has only three support arms. This allows the user a virtually unobstructed view from any angle to the rising level of coffee beneath the cone. In this way, the user does not have to turn the cone's position, or move around the cone in order to see through and beneath it. Another advantage to the frame design is that if desired, the user can pour milk into the cup as coffee is dripping into it. While the coffee is dripping, milk can be poured separately into the cup directly through the ring collar frame 5. This allows the user to know how the volume of milk will affect the coffee level and the remainder amount of coffee needing to be dripped.

A three-step fabrication process for the coffee cone is shown in FIGS. 1F and 1G. FIG. 1F is a flowchart that describes the process in text. FIG. 1G is a flowchart that shows the process in diagrams. To fabricate a coffee cone using sheet material, three steps are as follows:

First, cut and form a truncated cone from a flat sheet of material. Form the base of the cone in a circular shape to make a conical body with a circular base 1. The base of the conical body 1 is a drip ring with a circular shape 2.

Second, set a drip plate with a circular shape 3 that has one drip hole 4 inside the conical body 1 at a short height above the drip ring 2. The short height can be, but is not limited to, approximately equal to ¼ inch.

Third, affix a ring collar frame 5 to the exterior wall of the conical body 1 at or near the same level as the drip plate 3.

FIGS. 2A to 5B—Additional Embodiments

FIGS. 2A and 2B—Embodiment 2: Ovular Base

An additional embodiment of the invention is shown in shown in FIG. 2A (top view), and FIG. 2B (bottom view). This embodiment is the same as the first embodiment, except that the coffee cone has a conical body with an ovular shaped base 1' instead of a circular shaped base. The base of the conical body 1' forms a drip ring with an ovular shape 2'. This embodiment has a corresponding drip plate with an ovular shape 3'. The drip plate 3' has three drip holes 4. It has a ring collar frame 5' that has an inner ring with an ovular shape 6' instead of a circular shape, in order to fit around the ovular-shaped base of the conical body 1'. A measuring cup-style handle 10 is attached at the side of the conical body 1'.

FIGS. 3A and 3B—Embodiment 3: Drip Hole with a Screen

Another embodiment of the invention is shown in shown in FIG. 3A (top view), and FIG. 3B (bottom view). This embodiment is the same as the first embodiment, except that the drip plate 3 has a larger drip hole with a screen 4'. The screen can be made of mesh wire or similar construction, such as a sieve. Or, the screen can be a similar component that either acts as a filter, or supports a filter. The drip hole with a screen 4' can be made of, but is not limited to, mesh wire, such as stainless steel, gold, or similar material, or a drip plate with sieve-like holes, or a disc, plate, or similarly-cut portion of material that is semi-permeable. The drip hole with a screen 4' allows the user to put coffee grounds in the cone directly, without using a disposable paper or other filter. This embodiment can also be used with a filter if the user desires to do so. Some users may prefer this embodiment so that they can usually use it with a paper filter, for ease of clean-up, but also have a filter-free option for times when filters are not readily available. A tab style handle 10' is attached at the side of the conical body 1.

FIGS. 4A to 4D—Embodiment 4: Double-Walled

Another embodiment of the invention is shown in shown in FIG. 4A (front view), FIG. 4B (cross section view), FIG. 4C (top view), and FIG. 4D (bottom view). This embodiment is the same as the first, except that the coffee cone has a conical body with double-wall construction 1" in order to provide thermal insulation. The double-walled conical body 1" is comprised of both an inner and outer wall in order to accommodate air space between the two walls. The base of the double-walled conical body 1" is a drip ring with double wall construction 2".

FIGS. 5A and 5B—Embodiment 5: Solid Ring Collar

Another embodiment of the invention is shown in shown in FIG. 5A (top view), and FIG. 5B (bottom view). This embodiment is the same as the first, except that the coffee cone has a solid ring collar 9 that is a flat sheet of material instead of a frame. This simpler ring collar allows no view beneath the cone, but it is less expensive to construct. This embodiment provides consumers a choice of cone that offers all the benefits of metal's strength and inert surface chemistry, but that does not have the added expense of the frame-style ring collar.

OPERATION

FIGS. 1A to 5B

To fabricate the coffee cone, flat sheet material and tubular wire, or similar, is manipulated in a three-part process:

First, a truncated cone is fabricated from sheet material, such as metal, wood, or other flat sheeted material, to form a conical body 1, 1', or 1". The base of the conical body 1, 1', or 1" serves as a drip ring 2, 2', or 2".

Second, a drip plate 3 or 3' with one or more drip holes 4, or a drip hole with a screen 4' is set near the base of the inside of inside the conical body 1, 1' or 1".

Third, a ring collar made of tubular wire or similar 5, 5', or made of flat sheet material 9, is attached to the exterior wall of the conical body 1, 1', or 1" at or near the same level as the drip plate 3 or 3'.

To use the coffee cone, the cone is placed on top of a cup, carafe, or other receiving vessel, by setting the ring collar 5, 5', or 9, on the rim of the vessel. Next, a filter is placed into the conical body 1, 1', or 1". Paper filters are typically used. Other coffee filters could also be used with the cone such as those styled as a cotton sock, or a 'permanent filter' such as is typically composed of a frame supporting gold mesh screen. Next, coffee grounds are put into the filter. For embodiments that have a drip hole with a screen 4', the filter is optional and coffee grounds can be added directly into the cone. Next, nearly boiling water that was heated in a separate teakettle, or similar source, is poured over the grounds to drip through the cone into the vessel below. Coffee drips through the drip hole 4 or drip hole with a screen 4' that is supported by the drip plate 3 or 3'. Coffee drips through the base of the conical body 1, 1', or 1" that is the drip ring 2, 2', or 2" which directs coffee into the vessel beneath the cone. The process is complete when the vessel below is full of coffee. Models without a handle 10, or 10', are lifted by the conical body 1, 1' or 1" itself.

CONCLUSION

The embodiments of the invention improve prior art by simplifying coffee cone components so that they can most easily be fabricated using sheet materials. Simplifications include: a conical body which has a base that is a drip ring; and simplifying the shape and reducing the surface area of the ring collar. The ring collar constructed as a frame, like a wheel with spokes, which provides the best possible view to the coffee beneath the cone. Two additional important elements of the design are a drip plate level set near the base of the cone in order to provide maximize head space for drip filtration; and omission of interior ribbing.

Four additional embodiments have further improved elements. One embodiment of the cone has an oval-shaped base for the drip ring and its corresponding components in order to appeal to consumers who prefer to use standard removable paper filters. Another embodiment has a drip plate having a large drip hole with a sieve screen in order to allow coffee grounds to be added directly into the cone without using a secondary filter. Another embodiment of the cone has double walled insulation in order to reduce heat loss of coffee percolating through the cone, and to make the cone safer and easier to handle for the user. Another embodiment modifies the ring collar by constructing it as a solid sheet in order to reduce fabrication expense, while still retaining the benefits of sheet metal's strength and inert surface chemistry.

Accordingly, it is evident that the embodiments of the invention are superior to and improve prior art by omitting unnecessary parts and features in order to create a design that is most compatible with fabrication for sheet materials.

RAMIFICATIONS

1. Different Sizes, Volumes, and Diameters

The conical body or ring collar may have any possible variation of volume, height, or diameter. The conical body may be constructed in various sizes such as to fit various sizes of filters. The ring collar may have any variable radius or diameter whereby various models will sit on a wide range of rim sizes of the cup, carafe, pot, or other serving vessel below it. The conical body or ring collar may also be constructed in various sizes in order to fit into or on top of various receiving vessels including cups, carafes, pots, and other coffee-serving or coffee-making machines or devices.

2. Different Shapes for the Conical Body

The conical body may have any possible variation of shape. Shaping sheet metal is easily achieved in a typical spinning and drawing process. Also, the base of the conical body may have any shape. Instead of circular, or ovular shape, the base of the conical body may be another shape such as a modified ellipse, a rectangle with rounded edges, or any other shape. The corresponding drip plate and inner edge of the ring collar frame may or may not have a corresponding modified shape in order to fit against and attach to the conical body.

3. Thermal, Non-Slip, or Other Coating

A coating of rubber, silicone, or material of similar insulating nature may be added to the conical body, ring collar, ring collar frame, or handle. The coating material can serve multiple functions. It can act as a grip to prevent slipping. Also, it can provide insulation for the user's protection, and/or for the coffee's heat retention. There could be other desirable features offered by various coatings. Therefore, any portion or component of the cone may have a coating material affixed to it, whereby it provides a non-slip surface for the user, protective or thermal insulation, or other function deemed desirable in the future.

4. Modifications of the Handle

The handle of additional embodiments may take any shape such as a teacup style, measuring cup style, or tab style handle. For instance, the handle could be modified to have a reduced width or overall size in order to reduce the unit's weight. Additionally, the handle could be constructed as a single or double loop made of tubular metal wire or similar. The location of the handle could vary and include locations such as, but not limited to, the side of the cone, the top rim of the cone, or on the ring collar or ring collar frame. Omitting the handle, or having a tab style handle might apply to uses that would trade handling convenience for a greater savings in weight and packing volume.

5. Modifications of the Drip Plate

The drip plate may have any various shape. Its shape could vary by being flat, or a modified bent shape, whereby filtration is facilitated or improved. Also, the drip plate may have various methods of installation attaching it to the inside of the conical body. The drip plate could be permanently set in position inside the conical body. Alternatively, the drip plate could be set inside the conical body in a way that allows removal for cleaning. The removable feature also would allow the user to alternatively use the cone without a drip plate as a funnel. The drip plate may have any variation of a tab, collar, or other feature to affix it into the cone permanently, or to allow it to be lifted in and out as a removable part.

6. Drip Holes

The number and arrangement of the drip holes in the drip plate may be modified in various possible arrangements. It may be desirable to have multiple drip holes aligned in a triangular, linear, or other arrangement. Or, drip holes could exist as semi circles placed along the outer edge of the drip plate so that drips are directed to pass against the inside edge of the conical body and drip ring. They could also exist as a perforation or cut in the drip plate. Drip holes may be arranged in any number of various shapes, patterns or configurations. Drip holes may also have any variation of a screen, or similar screen-like component. Therefore, the drip plate may have a varying number, alignment, or arrangement of drip holes, screens, or similar, whereby filtration of coffee is made most effective.

7. Modifications to the Ring Collar

The ring collar may have any frame-like design that has various modifications to the shape, size, or number of support arms or spokes in the frame. Support arms may be of any varying size, shape, or number cut into, or attached to the ring collar, whereby a person can view the rising coffee level in the vessel below the cone. Other modifications could include, but are not limited to, omitting the inner ring of the ring collar frame and welding or otherwise affixing the radial spines directly to the conical body.

8. Cone Interior

The inside of the conical body could be modified from a smooth surface. The design of the inside of the cone could be modified to add scoring or similar texture to the metal surface in order to facilitate filtration. Therefore, the conical body may have variable interior features or designs that may or may not include scoring, texturing, or any variation thereof.

9. Materials, Coatings, and Decorations

A coffee dripper or funnel design made for sheet material is compatible with other sheet materials beyond metals. For example, this design can be used with woody materials produced in sheet form that are commonly used for kitchen tools and utensils, such as bamboo, and other woods. Other ramifications in material can be found in various materials that are used in cookware, industrial, chemical, and other industries. Another ramification includes the use of material coatings that improve the performance of the primary material. Another ramification of the invention is any decorative design that could be embossed on the material, affixed to it, or achieved as colorization.

10. Mixed Permutations of Components in Additional Embodiments

Additional embodiments may have mixed permutations of its components. For instance, though it is not specifically depicted in the drawing figures, any embodiment could have a conical body with an ovular shape instead of a circular shape. Or, instead of a drip hole, any embodiment could have a drip hole with a screen. Similarly, any embodiment may or may not have a handle. The drawings do not show the extent to which various permutations can be created by mixing together modifications in various multiple ways. Therefore, it is intended that any component with a reference numeral disclosed in the figures could be interchanged with one of the similar components shown with a different embodiment. The components listed with reference numerals can be mixed and matched with various embodiments, thus resulting in an embodiment that is not depicted in the figures, but which could be derived as a permutation from them.

SCOPE

Although the description above contains many specifics about design and material, these should not be construed as limiting the scope of the embodiments, but merely providing illustrations of some of the presently preferred embodiments. Additionally, the modifications discussed in the various embodiments of the invention can be combined in multiple permutations. The drawings are meant to show examples of individual features that can be modified. The scope of the embodiments should be determined by the appended claims and their legal equivalents, rather than by the examples or diagrams given.

We claim:

1. A method of making coffee using a drip-type filtering cone, comprising the following steps:

providing a coffee cone made from flat sheet material, the cone having the tapered shape of a truncated cone, the cone being hollow with an inside and an outside surface and having a top and a base, the top having a larger perimeter than the base, the inside of the cone having a plate with at least one hole, the plate being positioned intermediate the top and the base near the base of the cone, whereby a drip plate is provided, the cone having a collar constructed as a minimal frame attached to the outside surface of the cone, the collar having minimal support elements to seat the cone on top of a receiving vessel while allowing a view through the collar to the inside of the receiving vessel below, the collar comprising an inner ring of substantially circular or oval shape attached to the base of the cone, an outer ring and radially spaced, elongated support arms or spines joining the inner and outer rings, the inner and outer ring being connected only by the support arms or spines so as to allow an user a virtually unobstructed view of the inside of the vessel;

placing the cone onto a receiving vessel;

placing in the cone coffee grounds, with or without a filter;

pouring hot water into the cone, over the coffee grounds;

and seeing through the collar to view filtration of coffee dripping into the receiving vessel.

2. In the method of claim 1, said cone further including a handle, tab, or loop affixed to the cone which facilitates lifting it.

3. In the method of claim 1, said cone having any modified shape of its base, and the inside edge of said drip plate or collar having a correspondingly modified shape to fit against it, so as to enable the cone to be tailored to accommodate one or more filters.

4. In the method of claim 1, said drip plate having a modified drip hole with a screen.

5. In the method of claim 1, said cone further including double-wall construction, optionally having insulation between the double walls, whereby the conical body is made more insulating for retaining heat of the coffee water, and more heat-insulating protection is afforded to the user's hand.

6. A method of fabricating a drip-type filtering coffee cone, comprising three general steps:

One, a cone is formed from flat sheet material, the cone having the tapered shape of a truncated cone, the cone being hollow with an inside and an outside surface and having a top and a base, the top having a larger perimeter than the base;

Two, a plate with at least one hole is fixed inside the cone, the plate being positioned intermediate the top and the base near the base of the cone, whereby a drip plate is provided;

And three, a collar constructed as a minimal frame is attached to the outside surface of the cone, the collar having minimal support elements to seat the cone on top of a receiving vessel while allowing a view through the collar to the inside of the receiving vessel below, the collar comprising an inner ring of substantially circular or oval shape attached to the base of the cone, an outer ring and radially spaced, elongated support arms or spines joining the inner and outer rings, the inner and outer ring being connected only by the support arms or spines so as to allow an user a virtually unobstructed view of the inside of the vessel.

7. In the method of claim 6, said cone further including a handle, tab, or loop, affixed to the cone which facilitates lifting.

8. In the method of claim 6, said cone having any modified shape of its base, and the inside edge of said drip plate or collar having a correspondingly modified shape to fit against it, so as to enable the cone to be tailored to accommodate one or more filters.

9. In the method of claim 6, said drip plate having modified drip hole with a screen.

10. In the method of claim 6, said cone further including double-wall construction optionally having insulation between the double walls, whereby the conical body is made more insulating for retaining heat of the coffee water, and more heat-insulating protection is afforded to the user's hand.

11. A coffee cone made from flat sheet material, the cone having the tapered shape of a truncated cone, the cone being hollow with an inside and an outside surface and having a top and a base, the top having a larger perimeter than the base, the inside of the cone having a plate with at least one hole, the plate being positioned intermediate the top and the base near the base of the cone, whereby a drip plate is provided, the cone having a collar constructed as a minimal frame attached to the outside surface of the cone, the collar having minimal support elements to seat the cone on top of a receiving vessel while allowing a view through the collar to the inside of the receiving vessel below, the collar comprising an inner ring of substantially circular or oval shape attached to the base of the cone, an outer ring and radially spaced, elongated support arms or spines joining the inner and outer rings, the inner and outer ring being connected only by the support arms or spines so as to allow an user a virtually unobstructed view of the inside of the vessel.

12. The coffee cone of claim 11 further including a handle, tab or loop affixed to the cone which facilitates lifting it.

13. The coffee cone of claim 11 wherein said cone having any modified shape of its base, and the inside edge of said drip plate or collar having a correspondingly modified shape to fit against it, so as to enable the cone to be tailored to accommodate one or more filters.

14. The coffee cone of claim 11 wherein said drip plate has a drip hole with a screen.

15. The coffee cone of claim 11, said cone further including double-wall construction, optionally having insulation between the double walls, whereby the conical body is made more insulating for retaining heat of the coffee water, and more heat-insulating protection is afforded to the user's hand.

* * * * *